(12) United States Patent
Lee et al.

(10) Patent No.: US 7,636,330 B2
(45) Date of Patent: Dec. 22, 2009

(54) TRANSMITTING/RECEIVING POINT-TO-MULTIPOINT SERVICE IN WIRELESS COMMUNICATION SYSTEM

(75) Inventors: Young Dae Lee, Kyoungki-do (KR); Sung-Duck Chun, Anyang (KR)

(73) Assignee: LG Electronics Inc., Seoul (KR)

( * ) Notice: Subject to any disclaimer, the term of this patent is extended or adjusted under 35 U.S.C. 154(b) by 180 days.

(21) Appl. No.: 11/234,572

(22) Filed: Sep. 22, 2005

(65) Prior Publication Data
US 2006/0067289 A1   Mar. 30, 2006

(30) Foreign Application Priority Data
Sep. 24, 2004   (KR) .................. 10-2004-0076972

(51) Int. Cl.
*H04H 20/71* (2008.01)
(52) U.S. Cl. ..................................... 370/312; 370/329
(58) Field of Classification Search ................ 370/312, 370/329
See application file for complete search history.

(56) References Cited

U.S. PATENT DOCUMENTS

| 5,539,925 | A | * | 7/1996 | Yli-Kotila et al. | 340/7.36 |
|---|---|---|---|---|---|
| 2003/0125052 | A1 | * | 7/2003 | Jou | 455/466 |
| 2004/0087320 | A1 | * | 5/2004 | Kim et al. | 455/458 |
| 2004/0091022 | A1 | * | 5/2004 | Sarkar et al. | 375/147 |
| 2004/0103435 | A1 | * | 5/2004 | Yi et al. | 725/81 |
| 2004/0105402 | A1 | * | 6/2004 | Yi et al. | 370/312 |
| 2005/0232271 | A1 | * | 10/2005 | Kettunen et al. | 370/390 |

* cited by examiner

*Primary Examiner*—Lester Kincaid
*Assistant Examiner*—Steven Lim
(74) *Attorney, Agent, or Firm*—McKenna Long & Aldridge LLP (57) ABSTRACT

A method for controlling a user equipment (UE) capable of receiving a point-to-multipoint service in a wireless communication system comprises receiving the point-to-multipoint service on a physical channel from a network. The method also comprises receiving a first scheduling indicator associated with a number of scheduling periods where there is no transmission related to the point-to-multipoint service, wherein each scheduling period is associated with a scheduling indicator. The method also comprises receiving the point-to-multipoint service through the physical channel after the number of scheduling periods where there is no transmission. The point-to-multipoint service and the first scheduling indicator are received on the same physical channel. The method may further comprise receiving a second scheduling indicator after the number of scheduling periods where there is no transmission. The method may further comprise receiving the point-to-multipoint service through the physical channel in response to the second scheduling indicator.

22 Claims, 7 Drawing Sheets

TRANSMITTING/RECEIVING POINT-TO-MULTIPOINT SERVICE IN WIRELESS COMMUNICATION SYSTEM

CROSS-REFERENCE TO RELATED APPLICATIONS

Pursuant to 35 U.S.C. § 119(a), this application claims the benefit of earlier filing date and right of priority to Korean Application No. 2004-0076972, filed on Sep. 24, 2004, the contents of which are hereby incorporated by reference herein in their entirety.

FIELD OF THE INVENTION

The present invention relates generally to a wireless communication system and, more particularly, to communicating a point-to-multipoint service.

BACKGROUND OF THE INVENTION

Figure 1:
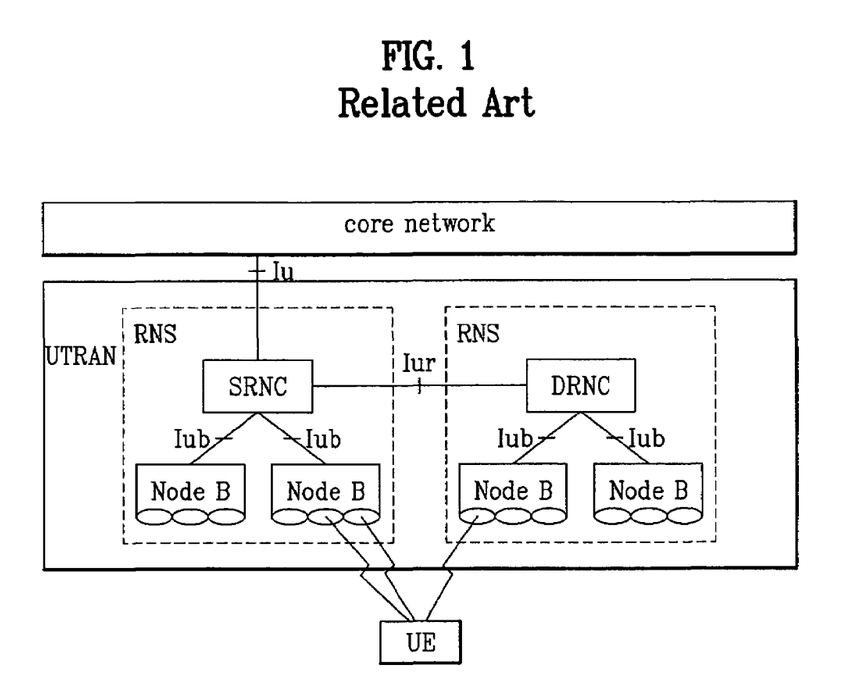
FIG. 1 is a block diagram illustrating a UMTS network structure.

FIG. 1 is a block diagram illustrating a UMTS (universal mobile telecommunications system) network structure.

Referring to FIG. 1, the UMTS system includes a terminal (user equipment (UE)), a UMTS terrestrial radio access network (UTRAN) and a core network (CN). The UTRAN includes at least one radio network sub-system (RNS). Each RNS includes one radio network controller (RNC) and at least one base station (e.g., node-B) managed by the RNC. At least one cell exists for each node-B.

Figure 2:
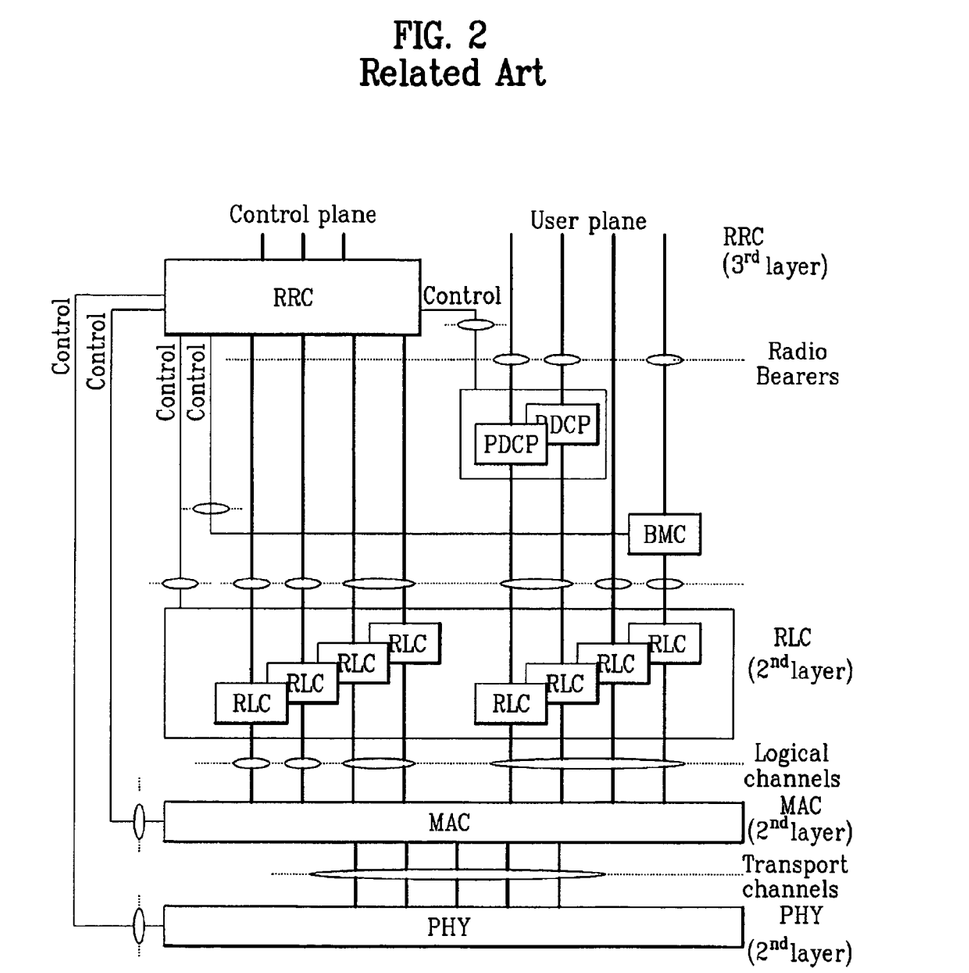
FIG. 2 is a diagram illustrating a radio interface protocol architecture between a terminal and a UTRAN.

FIG. 2 is a diagram illustrating a radio interface protocol architecture between a terminal and a UTRAN. As such, FIG. 2 depicts a radio interface protocol architecture based upon a 3GPP (third generation partnership project) radio access network specification between the terminal and the UTRAN.

Referring to FIG. 2, the radio interface protocol is horizontally arranged to include a physical layer, a data link layer, and a network layer. Furthermore, the radio interface protocol is vertically divided into a user plane for data information transfer and a control plane for signaling transfer. The protocol layers may also be divided into an L1 (first layer), an L2 (second layer) and an L3 (third layer) based upon the lower three layers of an open system interconnection (OSI) model.

The first layer or physical layer provides an upper layer with an information transfer service using a physical channel. The physical layer is connected to an upper layer called a medium access control (MAC) layer through a transport channel. Data is transferred between the MAC layer and the physical layer through the transport channel. Data is also transferred between different physical layers, i.e. between physical layers of a transmitting side and a receiving side, through the physical channel.

The MAC layer of the second layer provides an upper layer called a radio link control layer with a service through a logical channel. A radio link control (RLC) layer of the second layer supports reliable data transfer and performs segmentation and concatenation of a service data unit (SDU) received from an upper layer.

A radio resource control (RRC) layer at a lower portion of the L3 layer is defined in the control plane and controls logical channels, transport channels, and physical channels for configuration, re-configuration and release of radio bearers (RBs). A RB is a service provided by the second layer for data transfer between the terminal and the UTRAN. The configuration of the RBs includes defining characteristics of protocol layers and channels required to provide a specific service, and configuring respective specific parameters and operation methods.

A multimedia broadcast/multicast service (MBMS) is described below.

An MBMS provides a streaming or background service to a plurality of UEs using a downlink dedicated MBMS bearer service. An MBMS includes at least one session. MBMS data is transmitted to a plurality of the UEs via the MBMS bearer service during an ongoing session.

The UTRAN provides the MBMS bearer service to UE using a radio bearer (RB). A point-to-point radio bearer is a bi-directional radio bearer and includes a logical channel DTCH (dedicated traffic channel), a transport channel DCH (dedicated channel), and a physical channel DPCH (dedicated physical channel) or a physical channel SCCPCH (secondary common control physical channel). A point-to-multipoint radio bearer is a unidirectional downlink. The point-to-multipoint radio bearer includes a logical channel MTCH (MBMS traffic channel), a transport channel FACH (forward access channel), and a physical channel SCPCH. The logical channel MTCH is configured for each MBMS offered to a cell and is used to transmit user-plane data related to a specific MBMS to a plurality of UEs.

Figure 3:
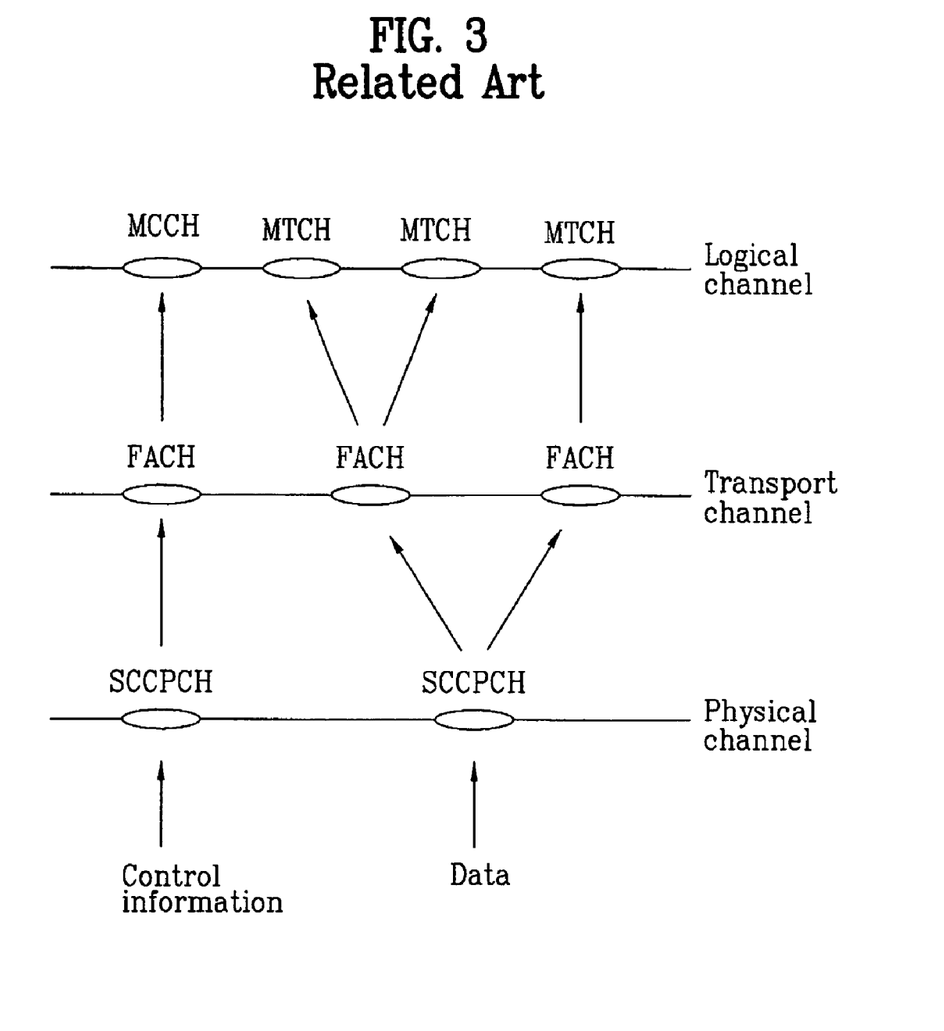
FIG. 3 is a diagram illustrating an example of channel mapping for reception of a point-to-multipoint service by a terminal.

FIG. 3 is a diagram illustrating an example of channel mapping for reception of a point-to-multipoint service by a terminal.

Referring to FIG. 3, a logical channel MCCH (MBMS control channel) is a point-to-multipoint downlink channel and is used in transmitting control information associated with the MBMS. The logical channel MCCH is mapped to the transport channel FACH (forward access channel), while the transport channel FACH is mapped to the physical channel SCCPCH (secondary common control physical channel). At least one MCCH exists within a cell.

The UTRAN that offers the MBMS transmits MCCH information to a plurality of UEs via the MCCH channel. The MCCH information includes a notification message associated with the MBMS (e.g., RRC message associated with the MBMS). For instance, the MCCH information may include a message providing notification of MBMS information, a message providing notification of point-to-multipoint radio bearer information, and/or access information providing notification of an EEC connection being requested for a specific MBMS.

Figure 4:
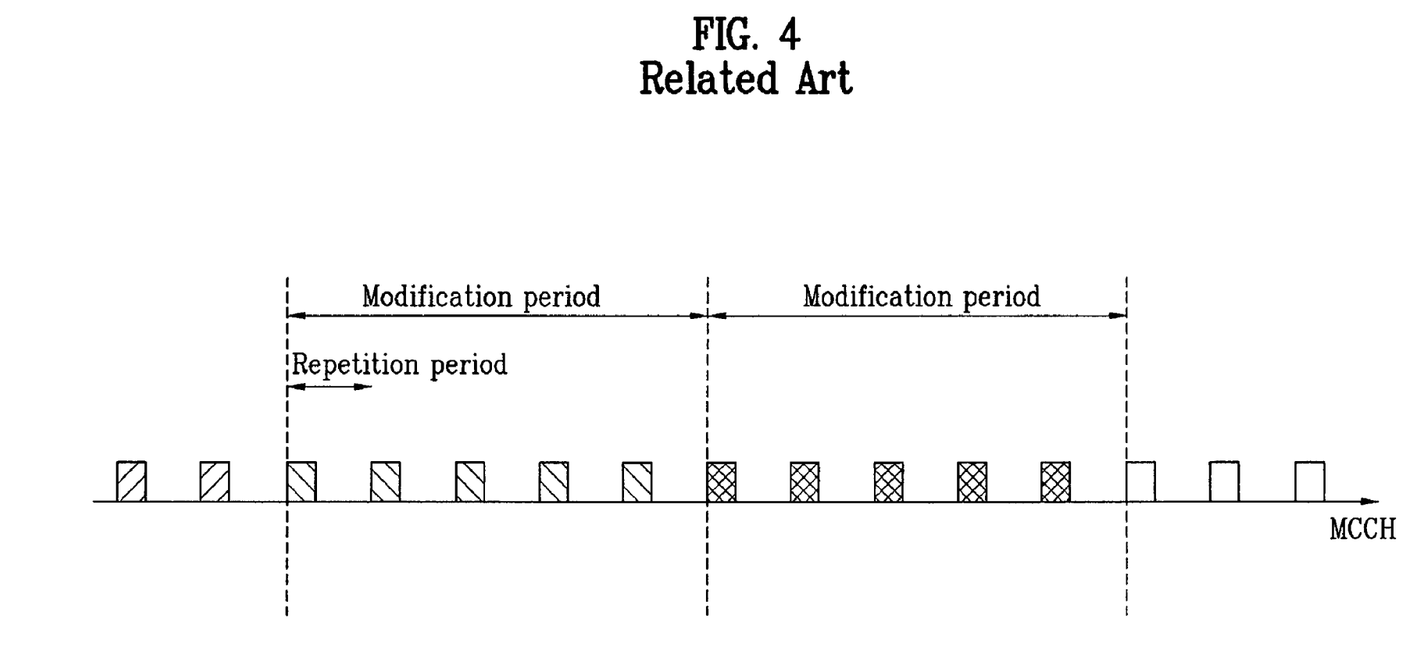
FIG. 4 is a diagram illustrating transmission of control information for the point-to-multipoint service.

FIG. 4 is a diagram illustrating transmission of control information for the point-to-multipoint service.

Referring to FIG. 4, the MCCH information is periodically transmitted according to a modification period and a repetition period. The MCCH information is divided into critical information and non-critical information. Among the critical information and non-critical information, the non-critical information may be modified at a modification period or a repetition period. However, the modification of the critical information may be made only at a modification period. Therefore, the critical information is repeated once during each repetition period in order to be transmitted. However, the transmission of the modified critical information may only occur at a start point of a modification period.

The UTRAN periodically transmits a physical channel MICH (MBMS notification indicator channel) to indicate whether the MCCH information was updated during the modification period. Therefore, a UE attempting to receive only a certain MBMS does not receive the MCCH or MTCH until a session of the certain MBMS service begins. However, the UE does receive a MICH (MBMS notification indicator channel) periodically. An update of the MCCH information is a generation, addition, modification and/or removal of a specific item of the MCCH information.

Once a session of a specific MBMS begins, the UTRAN transmits an NI (notification indicator). The NI is an indicator that provides notification to receive an MCCH channel to a UE attempting to receive a specific MBMS. Upon receiving the NI via an MICH, the UE receives an MCCH during a specific modification period indicated by the MICH.

A UE attempting to receive a specific MBMS using a point-to-multipoint radio bearer receives MCCH information including radio bearer information via an MCCH and then configures the point-to-multipoint radio bearer using the received information. After configuring the point-to-multipoint radio bearer, the UE continues to receive a physical channel SCCPCH to which an MTCH is mapped, in order to acquire data related to the specific MBMS transmitted via the MTCH.

Figure 5:
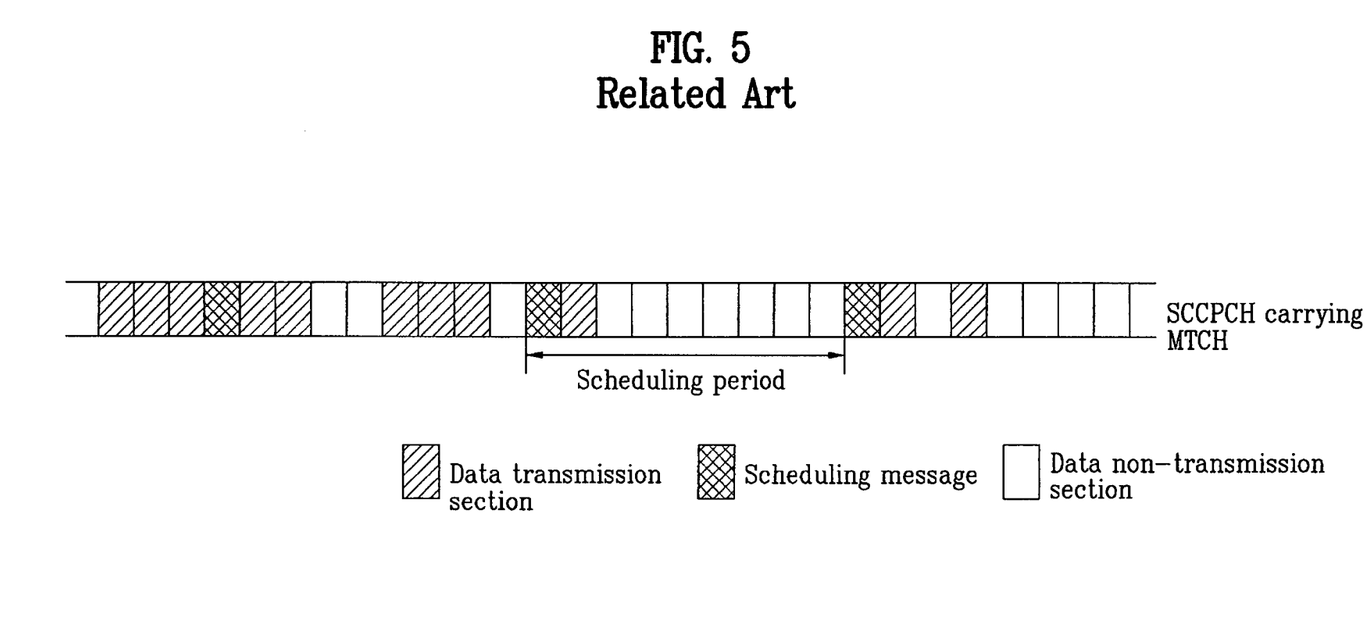
FIG. 5 is a diagram illustrating transmission of point-to-multipoint service data and scheduling information.

FIG. 5 is a diagram illustrating transmission of point-to-multipoint service data and scheduling information.

Referring to FIG. 5, a UTRAN may transmit MBMS data discontinuously via an MTCH. In so doing, the UTRAN periodically transmits a scheduling message via an SCCPCH (SCCPCH carrying MTCH), to which an MTCH is mapped, to a UE. In such case, the scheduling message provides a transmission start timing point and a transmission section of MBMS data transmitted during a single scheduling period. To this end, the UTRAN informs the UE of a transmission period (scheduling period) of scheduling information.

The UE acquires the scheduling period from the UTRAN and receives the scheduling message periodically according to the acquired scheduling period. The UE then receives the SCCPCH (SCCPCH carrying MTCH), to which the MTCH is mapped, discontinuously and periodically using the received scheduling message. Thus, using the scheduling message, the UE receives the SCCPCH carrying the MTCH during a timing section for which the data is transmitted but does not receive the SCCPCH carrying the MTCH during a timing section for which the data is not transmitted.

However, in the conventional method, the UE continues to receive the scheduling messages periodically even if there is no data transmission for several scheduling periods. Therefore, UE resources, such as a battery power, may be wasted. Furthermore, the UE checks the scheduling messages periodically regardless of a presence or non-presence of the data transmission. In a case where no data is transmitted, the UE may not need to receive the SCCPCH carrying the MTCH. However, in such a case, the UE still needs to periodically check the scheduling messages. Therefore, the UE may consume UE resources to receive the SCCPCH carrying the MTCH.

SUMMARY OF THE INVENTION

Accordingly, the present invention is directed to communication of a point-to-multipoint service that substantially obviates one or more problems due to limitations and disadvantages of the related art.

An object of the present invention is to provide for communication of a point-to-multipoint service in which a network transmits reception reservation information to a UE to delay reception of a scheduling message. The present invention may therefore conserve UE resources, such as battery power.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in one embodiment, a method for controlling a user equipment (UE) capable of receiving a point-to-multipoint service in a wireless communication system comprises receiving the point-to-multipoint service on a physical channel from a network. The method also comprises receiving a first scheduling indicator associated with a number of scheduling periods where there is no transmission related to the point-to-multipoint service, wherein each scheduling period is associated with a scheduling indicator. The method also comprises receiving the point-to-multipoint service through the physical channel after the number of scheduling periods where there is no transmission. The point-to-multipoint service and the first scheduling indicator are received on the same physical channel.

The method may further comprise receiving a second scheduling indicator after the number of scheduling periods where there is no transmission. The method may further comprise receiving the point-to-multipoint service through the physical channel in response to the second scheduling indicator.

The same physical channel may comprise a common physical channel. The common physical channel may comprise an SCCPCH (secondary common physical channel). The point-to-multipoint service, the first scheduling indicator and the second scheduling indicator may be received on different logical channels. The first scheduling indicator and the second scheduling indicator may be received on the same logical channel. The point-to-multipoint service may be received on a MTCH (MBMS traffic channel). Alternatively, the point-to-multipoint service is received on a different type of logical channel. The network may be a UTMS terrestrial radio network (UTRAN).

In another embodiment, a method in a network for controlling a user equipment (UE) capable of receiving a point-to-multipoint service in a wireless communication system comprises transmitting the point-to-multipoint service on a physical channel, and determining a number of scheduling periods where there is no transmission related to the point-to-multipoint service. The method also comprises transmitting a first scheduling indicator associated with the number of scheduling periods where there is no transmission, wherein each scheduling period is associated with a scheduling indicator. The method also comprises transmitting the physical channel after the number of scheduling periods where there is no transmission. The method also comprises transmitting the point-to-multipoint service through the physical channel after the number of scheduling periods where there is no transmission. The point-to-multipoint service and the first scheduling indicator are transmitted on the same physical channel. The method may further comprise transmitting a second scheduling indicator after the number of scheduling periods where there is no transmission.

The foregoing and other objects, features, aspects and advantages of the present invention will become more apparent from the following detailed description of the present invention when taken in conjunction with the accompanying drawings. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

The present invention may be embodied in a mobile communications system such as the UMTS (universal mobile telecommunications system) developed by the 3GPP (third generation partnership project). However, the present invention may also be applied to communications systems operated using other specifications. Furthermore, the point-to-multipoint service referred to herein may be a multimedia broadcast/multicast service (MBMS) or other type of service. Additionally, the terminal referred to herein may be a user equipment (UE) or other type of terminal.

Figure 6:
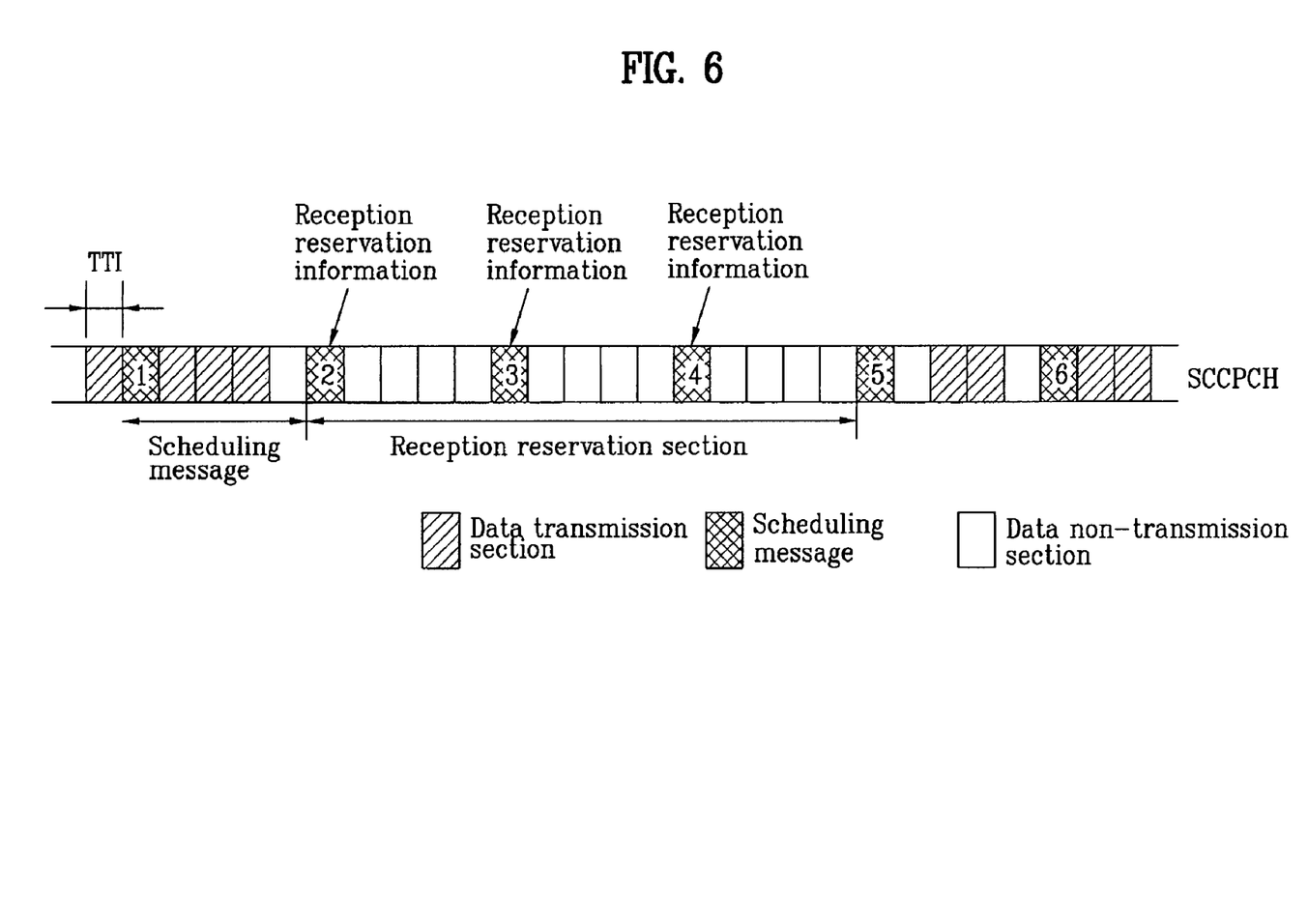
FIG. 6 is a diagram illustrating transmission/reception of the point-to-multipoint service, according to an embodiment of the present invention.

FIG. 6 is a diagram illustrating transmission/reception of the point-to-multipoint service, according to an embodiment of the present invention. As such, FIG. 6 shows transmission/reception of a point-to-multipoint multimedia service in which a scheduling message and MBMS data are transmitted via a physical channel, such as a SCCPCH.

Referring to FIG. 6, a UTRAN transmits a scheduling message in each scheduling period. The scheduling message may include data transfer information that includes a transmission start timing point, and a transmission section of MBMS data transmitted during one scheduling period. The data transfer information may also include a message indicating that there is no data to be transmitted during a corresponding scheduling period, and/or reception reservation information. In a case where no data is to be transmitted or continuously transmitted for several scheduling periods (e.g., reception reservation section) for a specific MBMS, the UTRAN transmits the reception reservation information via the scheduling message that is transmitted for the section with no data to be transmitted. The reception reservation information may be included in the scheduling message. Alternatively, the reception reservation information may be transmitted by other means.

Operations of the UTRAN and the UE pertaining to the first to sixth scheduling messages, as shown in FIG. 6, are described below.

The UTRAN provides notification of transmission information related to the data transmitted between the first scheduling message and the second scheduling message to the UE via the first scheduling message. The UE receives the scheduling message in each scheduling period. After receiving the first scheduling message, the UE receives the data transmitted between the first and second scheduling messages according to the transmission information related to the data transmitted between the first and second scheduling messages.

The UTRAN transmits reception reservation information that is included in the second scheduling message. In a case where no data is to be transmitted between the second scheduling message and the fifth scheduling message for a corresponding MBMS, as shown in FIG. 6, the UTRAN informs the UE that reception of the third and fourth scheduling messages is reserved, using the reception reservation information included in the second scheduling message. For example, a value of a scheduling message reception reservation section included in the reception reservation information may be set to '2', to inform the UE to reserve reception of two scheduling messages transmitted after the transmission of the second scheduling message.

Furthermore, after receiving the second scheduling message, the UE acquires the reception reservation information included in the corresponding message and reserves reception of scheduling messages until the fifth scheduling message is transmitted. Thus, the UE receives the second scheduling message, but does not receive the third and fourth scheduling messages.

If a UE fails to receive the second scheduling message, the UTRAN may transmit reception reservation information via the third scheduling message. In such case, the reception reservation information included in the third scheduling message informs the UE that reception of the fourth scheduling message is reserved. For example, a value of a scheduling message reception reservation section included in the reception reservation information may be set to '1', to instruct the UE to reserve reception of one scheduling message transmitted after reception of the third scheduling message. Furthermore, after receiving the third scheduling message, the UE acquires the reception reservation information included in the corresponding message and reserves reception of scheduling messages until the fifth scheduling message is transmitted. Thus, the UE receives the third scheduling message, but does not receive the fourth scheduling message.

When a UE fails to receive the second and third scheduling messages, the UTRAN transmits the fourth scheduling message. The fourth scheduling message provides notification that there is no data to be transmitted between the fourth and fifth scheduling messages for the specific MBMS. Furthermore, having received the fourth scheduling message, the UE may recognize that there is no data to be transmitted. The UE may then not receive the channel through which the MBMS data is transmitted until the fifth scheduling message is transmitted.

The UTRAN provides notification of transmission information related to the data transmitted between the fifth scheduling message and the sixth scheduling message to the UE via the fifth scheduling message. The transmission information may include a transmission start point and a length of a transmission section of the data. The UE receives the fifth scheduling message and then receives the data transmitted between the fifth scheduling message and the sixth scheduling message, according to the transmission information related to the data included in the corresponding message.

Figure 7:
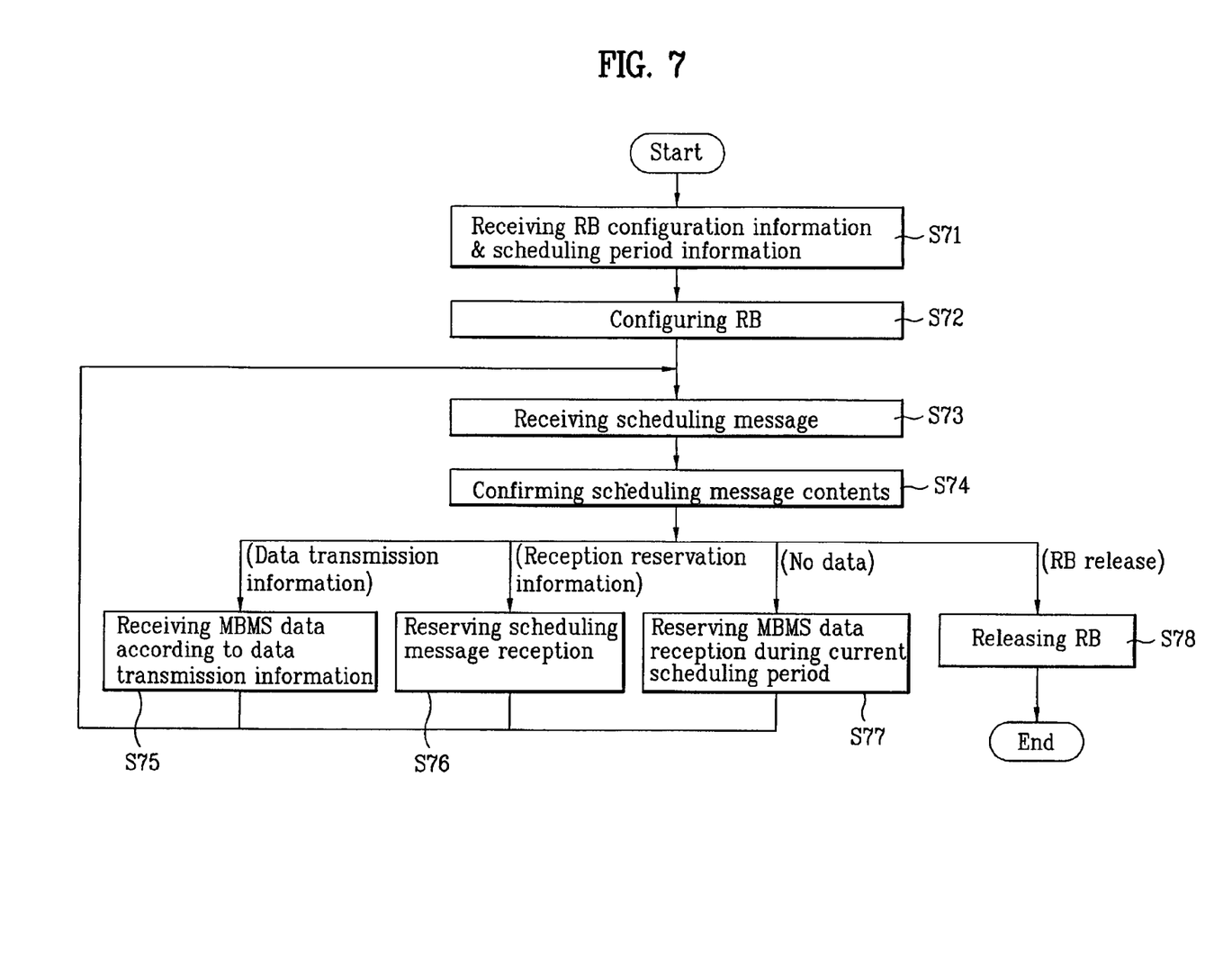
FIG. 7 is a flow diagram illustrating information processing based on a scheduling message received from the UTRAN by the terminal, according to an embodiment of the present invention.

FIG. 7 is a flow diagram illustrating information processing based on a scheduling message received from the UTRAN by the terminal, according to an embodiment of the present invention.

Referring to FIG. 7, a UE attempting to receive a specific MBMS acquires configuration information related to a point-to-multipoint radio bearer for the specific MBMS. The UE also receives scheduling period information, which is a transmission period of a scheduling message for supporting a data transmission of the specific MBMS from a UTRAN (S71). The UE configures the point-to-multipoint radio bearer according to the acquired radio bearer configuration information (S72). Once the point-to-multipoint radio bearer is configured, protocol layer and channel characteristics that are needed to offer the MBMS are defined and the specific parameters and operational methods are respectively established.

The UE receives a scheduling message transmitted from the UTRAN via a specific physical channel using the acquired scheduling period information (S73). After confirming the content of the received scheduling message (S74), the UE operates according to the content of the scheduling message as follows.

First, in a case where the content included in the scheduling message corresponds to data transmission information, e.g., the information indicating when the data will be transmitted, such as a data transmission start point and a data transmission section length, the UE discontinuously receives the physical channel according to the data transmission information in order to receive the data (S74). The UE then waits for transmission of a scheduling message in a next scheduling period.

Alternatively, if the content included in the scheduling message corresponds to reception reservation information, the UE reserves reception of scheduling messages during a time period defined by the reception reservation information. Alternatively, the UE reserves reception of scheduling messages for a set number of scheduling messages, as instructed by the reception reservation information (S75). Accordingly, the UE does not receive the physical channel during the time period or for the set number of scheduling messages. Instead, the UE waits for a scheduling message transmitted after the time period or the set number of scheduling messages.

Again, in the alternative, in case where the content included in the scheduling message corresponds to information indicating that there is no transmission of data during a corresponding scheduling period, the UE does not receive the physical channel during the corresponding scheduling period (S76). Instead, the UE waits for transmission of a scheduling message during a next scheduling period.

Again, in the alternative, if the content included in the scheduling message corresponds to information indicating a release of the radio bearer for the MBMS, the UE releases the radio bearer (S77) and terminates the specific MBMS receiving process.

The physical channel carrying the scheduling message may preferably be the same as the physical channel carrying the MBMS data. The physical channel may be, for example, a SCCPCH. The MBMS data may preferably be transmitted via a logical channel MTCH mapped to the SCCPCH. The scheduling message may preferably be transmitted via a logical channel other than the MTCH, and be mapped to the SCCPCH.

In one embodiment, a method for controlling a user equipment (UE) capable of receiving a point-to-multipoint service in a wireless communication system comprises receiving the point-to-multipoint service on a physical channel from a network. The method also comprises receiving a first scheduling indicator associated with a number of scheduling periods where there is no transmission related to the point-to-multipoint service, wherein each scheduling period is associated with a scheduling indicator. The method also comprises receiving the point-to-multipoint service through the physical channel after the number of scheduling periods where there is no transmission. The point-to-multipoint service and the first scheduling indicator are received on the same physical channel.

The method may further comprise receiving a second scheduling indicator after the number of scheduling periods where there is no transmission. The method may further comprise receiving the point-to-multipoint service through the physical channel in response to the second scheduling indicator.

The same physical channel may comprise a common physical channel. The common physical channel may comprise an SCCPCH (secondary common physical channel). The point-to-multipoint service, the first scheduling indicator and the second scheduling indicator may be received on different logical channels. The first scheduling indicator and the second scheduling indicator may be received on the same logical channel. The point-to-multipoint service may be received on a MTCH (MBMS traffic channel). Alternatively, the point-to-multipoint service is received on a different type of logical channel. The network may be a UTMS terrestrial radio network (UTRAN).

In another embodiment, a method in a network for controlling a user equipment (UE) capable of receiving a point-to-multipoint service in a wireless communication system comprises transmitting the point-to-multipoint service on a physical channel, and determining a number of scheduling periods where there is no transmission related to the point-to-multipoint service. The method also comprises transmitting a first scheduling indicator associated with the number of scheduling periods where there is no transmission, wherein each scheduling period is associated with a scheduling indicator. The method also comprises transmitting the physical channel after the number of scheduling periods where there is no transmission. The method also comprises transmitting the point-to-multipoint service through the physical channel after the number of scheduling periods where there is no transmission. The point-to-multipoint service and the first scheduling indicator are transmitted on the same physical channel. The method may further comprise transmitting a second scheduling indicator after the number of scheduling periods where there is no transmission.

Although the present invention may apply to an asynchronous radio mobile communication system, such as that being standardized by the 3GPP (third generation partnership project), the present invention may also apply to other mobile communication systems offering a point-to-multipoint service.

The present invention enables a user equipment (UE), which discontinuously receives data related to a point-to-multipoint service, to efficiently utilize resources, such as battery power.

It will be apparent to those skilled in the art that various modifications and variations may be made in the present invention without departing from the spirit or scope of the inventions. Thus, it is intended that the present invention covers the modifications and variations of this invention provided they come within the scope of the appended claims and their equivalents.

What is claimed is:

1. A method for controlling a user equipment (UE) capable of receiving a point-to-multipoint service in a wireless communication system, the method comprising:
   establishing a session with the point-to-multipoint service, during which, the point-to-multipoint service is discontinuously received on a physical channel from a network;
   during the session, and during a current scheduling period, receiving a first scheduling indicator, wherein the first scheduling indicator identifies a number of scheduling periods during the session where there is no transmission related to the point-to-multipoint service, and wherein the number of scheduling periods occurs after the current scheduling period; and
   receiving the point-to-multipoint service through the physical channel after the number of scheduling periods where there is no transmission;
   wherein the point-to-multipoint service and the first scheduling indicator are received on the same physical channel.

2. The method of claim 1, further comprising receiving a second scheduling indicator after the number of scheduling periods where there is no transmission.

3. The method of claim 2, further comprising receiving the point-to-multipoint service through the physical channel in response to the second scheduling indicator.

4. The method of claim 1, wherein the same physical channel comprises a common physical channel.

5. The method of claim 4, wherein the common physical channel comprises an SCCPCH (secondary common physical channel).

6. The method of claim 3, wherein the point-to-multipoint service is received on a logical channel different from another logical channel on which the first scheduling indicator and the second scheduling indicator are received.

7. The method of claim 6, wherein the first scheduling indicator and the second scheduling indicator are received on the same logical channel.

8. The method of claim 7, wherein the point-to-multipoint service is received on a MTCH (MBMS traffic channel).

9. The method of claim 7, wherein the point-to-multipoint service is received on: a different type of logical channel.

10. The method of claim 1, wherein the network is a UTMS terrestrial radio network (UTRAN).

11. A method in a network for controlling a user equipment (UE) capable of receiving a point-to-multipoint service in a wireless communication system, the method comprising:
    establishing a session with the point-to-multipoint service, during which, the point-to-multipoint service is discontinuously received on a physical channel;
    determining a number of scheduling periods where there is no transmission related to the point-to-multipoint service;
    during the session, and during a current scheduling period, transmitting a first scheduling indicator, wherein the first scheduling indicator identifies the number of scheduling periods during the session that contain no transmission related to the point-to-multipoint service, and wherein the number of scheduling periods that contain no transmission related to the point-to-multipoint service occurs after the current scheduling period; and
    transmitting the point-to-multipoint service through the physical channel after the number of scheduling periods where there is no transmission;
    wherein the point-to-multipoint service and the fist scheduling indicator are transmitted on the same physical channel.

12. The method of claim 11, further comprising transmitting a second scheduling indicator after the number of scheduling periods where there is no transmission.

13. The method of claim 11, wherein the same physical channel comprises a common physical channel.

14. The method of claim 11, wherein the common physical channel comprises a SCCPCH (second common physical channel).

15. The method of claim 11, wherein the point-to-multipoint service is received on a logical channel different from another logical channel on which the first scheduling indicator and the second scheduling indicator are received.

16. The method of claim 15, wherein the first scheduling indicator and the second scheduling indicator are received on the same logical channel.

17. The method of claim 16, wherein the point-to-multipoint service is received on a MTCH (MBMS traffic channel).

18. The method of claim 17, wherein the point-to-multipoint service is received on a different type of logical channel.

19. The method of claim 11, wherein the network is a UTMS terrestrial radio network (UTRAN).

20. A user equipment (UE) capable of receiving a point-to-multipoint service in a wireless communication system, the user equipment comprising:
    means for establishing a session with the point-to-multipoint service, during which, the point-to-multipoint service is discontinuously received on a physical channel from a network;
    means for during the session, and during a current scheduling period, receiving a first scheduling indicator, wherein the first scheduling indicator identifies a number of scheduling periods during the session that contain no transmission related to the point-to-multipoint service, wherein the number of scheduling periods that contain no transmission related to the point-to-multipoint service occurs after the current scheduling period; and
    means for receiving the point-to-multipoint service through the physical channel after the number of scheduling periods where there is no transmission;
    wherein the point-to-multipoint service and the first scheduling indicator are received on the same physical channel.

21. The user equipment of claim 20, further comprising means for receiving a second scheduling indicator after the number of scheduling periods where there is no transmission.

22. The user equipment of claim 21, further comprising means for receiving the point-to-multipoint service through the physical channel in response to the second scheduling indicator.

* * * * *